Dec. 11, 1951  N. R. ASHBAUGH  2,578,334
HYDRAULIC SELECTOR VALVE
Filed April 15, 1949  2 SHEETS—SHEET 1
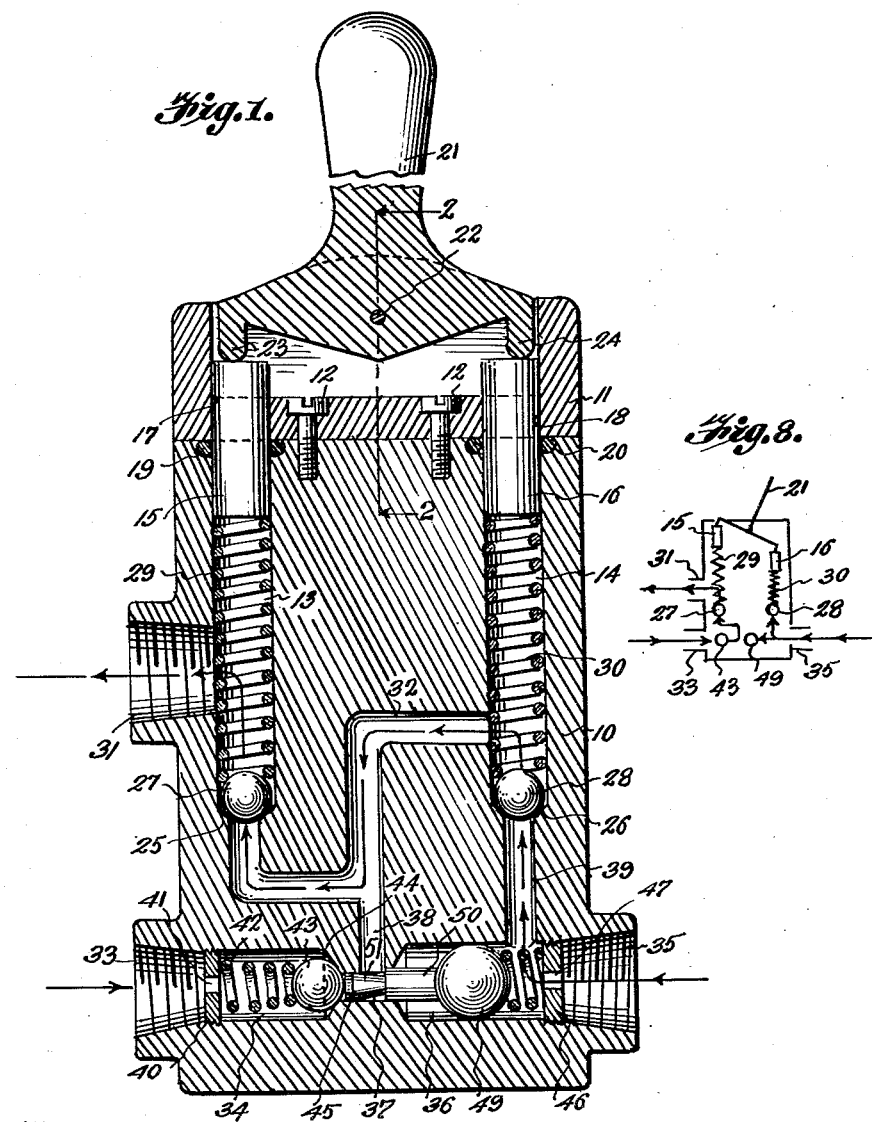
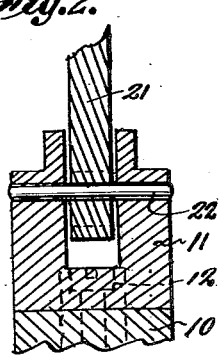
Inventor
NORMAN R. ASHBAUGH
By Patrick D. Beavers
Attorney

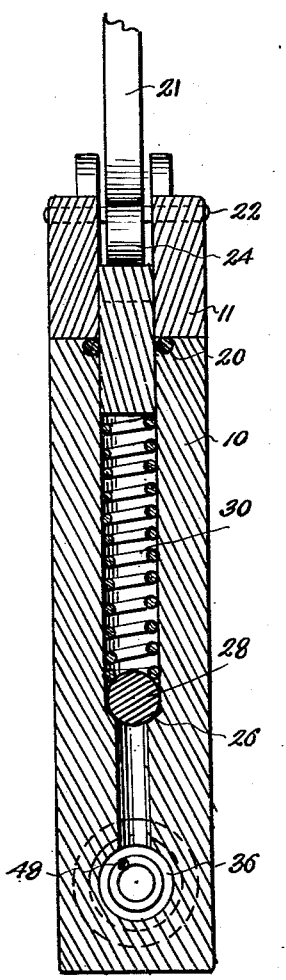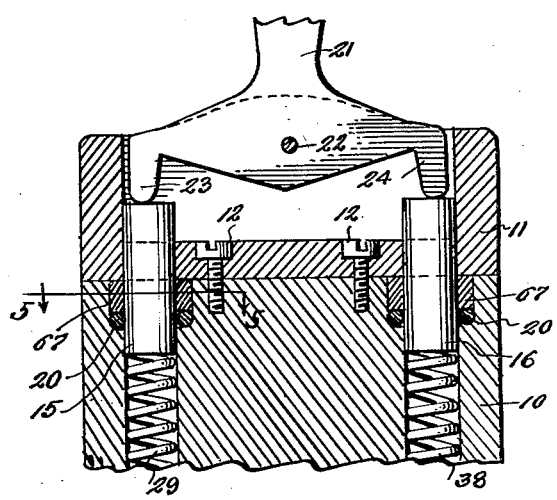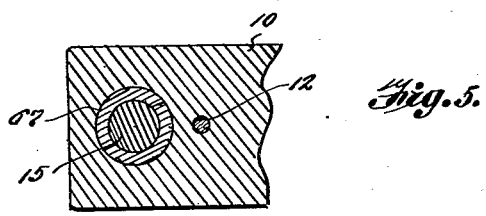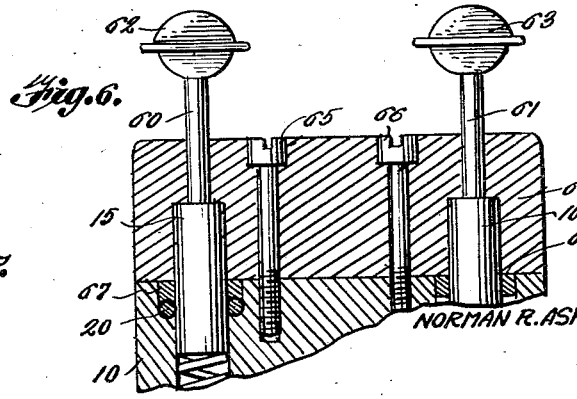

Patented Dec. 11, 1951

2,578,334

UNITED STATES PATENT OFFICE 2,578,334

HYDRAULIC SELECTOR VALVE

Norman R. Ashbaugh, Wichita, Kans.

Application April 15, 1949, Serial No. 87,733

4 Claims. (Cl. 277—20)

The present invention relates to an hydraulic selector valve and it consists in the combinations, constructions and arrangements of parts herein described and claimed.

Generally there is provided an hydraulic selector valve, a valve housing having connections for a pump, a container and a tank and an arrangement of valves and passageways therein selective movements of a control handle pivotally mounted in the upper end of the housing will cause a flow of fluid from the pump to the container, a flow of fluid from the container to the tank or a flow from the pump to the tank depending upon the position of the control handle.

It is accordingly an object of the invention to provide a hydraulic selector valve which is simple in construction and operation and yet effective and efficient in its use.

Another object of the invention is the provision of a novel arrangement of valves and passageways within a valve housing which may be simply controlled to control the metered direction of flow of a fluid between connections to the housing.

Another object of the invention is the provision of novel relief valves against excessive fluid pressures with a device of the character set forth.

A further object of the invention is the provision of a device of the character set forth which will be inexpensive to install and inexpensive to manufacture.

A further object of the invention is the provision of a device of the character set forth in which provision is made for simple pushbutton operation.

A further object of the invention is the provision of a device of the character set forth wherein the pressure within the fluid lines is utilized to assist in the control of the various valves forming a part of the invention.

Other and further objects of the invention will become apparent from a reading of the following specification taken in conjunction with the drawings, in which:

Figure 1 is a vertical elevational view of an embodiment of the invention,

Figure 2 is a fragmentary sectional view taken along line 2—2 of Figure 1,

Figure 3 is a vertical sectional view taken at right angles to the section shown in Figure 1, Figure 4 is a fragmentary vertical sectional view illustrating certain details of the invention, Figure 5 is a fragmentary sectional view taken along line 5—5 of Figure 4, Figure 6 is a fragmentary vertical sectional view illustrating a modification of the invention, and Figures 7 and 8 are schematic views illustrating the functioning of the invention.

Referring more particularly to the drawings, there is shown therein a hydraulic selector valve having a housing 10 to the upper end of which is affixed a head 11 by means of screws 12. A pair of vertically disposed cylinders 13 and 14 is provided in the body 10 and plungers 15 and 16 are slidably mounted in the upper ends of the cylinders 13 and 14 and extend upwardly through openings 17 and 18, respectively in the head 11.

Neoprene rings 19 and 20 are disposed at the upper end of the body 10 to surround the plungers 15 and 16, respectively. An operating handle 21 is pivotally mounted in the upper end of the head 11, as indicated at 22, and is provided with a pair of dependent arms 23 and 24 which respectively contact the upper ends of the plungers 15 and 16.

The lower ends of the cylinders 13 and 14 are provided with valve seats 25 and 26, respectively, for ball valves 27 and 28. A compression spring 29 is interposed between the lower end of the plunger 15 and the ball 27 and a compression spring 30 is interposed between the lower end of the plunger 16 and the ball 28.

A threaded connection 31 provides an opening whereby the cylinder 13 may communicate with a tank (not shown) and a circuitous passageway 32 communicates with the lower end of the cylinder 13 and with a point in the cylinder 14 above the ball valve 28.

At one side of the lower end of the body 10 there is provided a fitting 33 for connecting a container (not shown) with a valve recess 34 in the lower end of the body 10 and upon the other lower side of the body there is provided a fitting 35 which provides a connection with a pump (not shown) with a valve chamber 36 likewise formed in the lower end of the body 10.

A horizontal passageway 37 interconnects the chambers 34 and 36 and a vertical passageway 38 interconnects the passageway 32 and the passageway 37. A vertically disposed passageway 39 interconnects the lower end of the cylinder 14 and the chamber 36.

In the inner end of the connection 33 there is threadably mounted a circular spring detent 40 having a centrally disposed opening 41 therein and a compression spring 42 bears against the inner face of the member 40 and a ball valve 43 which is provided with a seat 45. Within the inner end of the connection 35 there is provided a circular valve detent 46 having a centrally disposed opening 47 therein and a compression spring 48 bears against the inner face of the member 46 and against a ball 49 mounted in the chamber 36. A metering shaft 50 rigidly interconnects the balls 43 and 49 and is provided with a taper reduced portion 51 adjacent the ball valve 43.

In operation, it will be apparent that the fluid under pressure is adapted to be delivered from the pump through the connection 35 and, if the handle 21 is disposed to the left as viewed in Figure 1 or schematically in Figure 7, the flow will be from the pump to the container. This takes place due to the fact that the movement of the handle to the left as above described will cause a seating of the valve 27 in its seat 25. The pressure will also cause a movement of the ball 49 to the left and a consequent unseating of the valve 43. Likewise the pressure will cause a lifting of the valve 28 and thus the fluid may flow through the passageway 39, the cylinder 14, the passageway 32, the passageway 38, the passageway 37 and thence through the chamber 34 and through the opening 41 into the fitting 33.

If the handle 21 is moved to the right as viewed in Figure 1 and schematically in Figure 8, the flow of fluid would be from the container to the tank. This is caused by the plunger 16 impinging upon the spring 30 to thereby seat the valve 28 in its seat 26 thus effectively cutting off any flow of fluid through the passage 39. Consequently the pressure will cause a movement to the left of the ball 49 thereby unseating the valve ball 43. Since the valve 27 is unseated in this arrangement, the flow of fluid will be from the cylinder to its connection 33 through the opening 41 into the chamber 34 and thence into the passageway 37 past the reduced portion 51 of the connector 50 and thence into the passageway 38 and finally into the passageway 32 past the valve 27 into the cylinder 13 and to the tank through its connection 31.

When the handle 21 is held or left in a vertical position as shown in Figure 1, the flow of fluid will be from the pump to the tank utilizing the connections 35 and 31, respectively. This is due to the fact that flow of fluid through the opening 47 into the chamber 36 and thence through the passage 39 past the valve 28 into the cylinder 14 thence through the passageway 32 to the lower end of the cylinder 13 past the valve 27 into the cylinder 13 and thence through the connection 31 is unimpeded, whereas the spring 42 will cause an inward movement of the ball 43 against the valve seat 45 to hold the latter seated in its seat 45.

It will be apparent that the ball valves 27 and 28 not only act as ordinary valves but also as relief valves due to the fact that the travel of the plungers 15 and 16 in the cylinders 13 and 14 is fixed, thereby fixing the maximum pressure and thus assuring the fact that the pressure of the fluid will not exceed the designed strength of the valve, container or pump. Thus, any excess of pressure in the fluid will cause the valves 27 and/or 28 to open and allow a return of the fluid to the tank.

In Figure 6 there is shown a modified form the invention may assume. In this case the plungers 15 and 16 are respectively provided with upwardly extending shafts 60 and 61 which terminate in operating handles 62 and 63. The shafts 60 and 61 are slidably mounted in a head 64 for the body 10 as are the upper ends of the plungers 15 and 16. Screws 65 and 66 connect the head 64 to the body 10. In Figures 4 and 6 bronze wiper rings 67 are provided to cover the neoprene rings 20 to protect the same.

In the operation of the form of the invention shown in Figure 6, the same will be identical with the exception that the plungers 15 and 16 may now be moved individually by means of the handles 62 and 63, the action remaining the same.

While but two forms of the invention have been shown and described herein, it will be readily apparent to those skilled in the art that many minor modifications may be made without departing from the spirit of the invention or the scope of the appended claims.

What is claimed is:

1. A device of the character described comprising a body having valved passages therein and having a pump connection, a container connection and a tank connection, a head for said body, a handle pivotally mounted in said head and means operable by the selective positioning of the handle to selectively permit the flow of fluid from the pump to the container, from the pump to the tank and from the container to the tank, said means including a pair of cylinders vertically disposed in said body, a ball valve seated in the lower end of each cylinder, a plunger slidably mounted in the upper end of each cylinder and extending through said head, a spring interposed between each of the valves and its associated plunger, a pair of dependent arms carried by the handle and abutting the upper ends of said plungers, a circuitous passageway connecting one cylinder above its valve with the other cylinder below its valve, a passageway between the last mentioned cylinder and the tank connection, a passageway connecting the lower end of the first-mentioned cylinder and the pump connection, a chamber connected with the container connection, a valved passageway between said chamber and the circuitous passageway.

2. A device of the character described comprising a body having valved passages therein and having a pump connection, a container connection and a tank connection, a head for said body, a pair of shafts vertically reciprocable in said head, a handle at the upper end of each shaft and means operable by the selective movement of said handles to selectively permit the flow of fluid from the pump to the container, from the pump to the tank and from the container to the tank, said means including a pair of cylinders vertically disposed in said body, a ball valve seated in the lower end of each cylinder, a plunger affixed to the lower end of each shaft and slidably mounted in the upper end of each cylinder, a spring interposed between each of the valves and its associated plunger, a handle at the upper end of each shaft, a circuitous passageway connecting one cylinder above its valve with the other cylinder below its valve, a passageway between the last-mentioned cylinder and the tank connection, a passageway connecting the lower end of the first-mentioned cylinder and the pump connection, a chamber connected with the container connection, a valved passageway between said chamber and the circuitous passageway.

3. A device of the character described comprising a body having valved passages therein and having a pump connection, a container connection and a tank connection, a head for said body, a handle pivotally mounted in said head and means operable by the selective positioning of the handle to selectively permit the flow of fluid from the pump to the container, from the pump to the tank and from the container to the tank, said means including a pair of cylinders vertically disposed in said body, a ball valve seated in the lower end of each cylinder, a plunger slidably mounted in the upper end of each cylinder and extending through said head, a spring interposed between each of the valves and its associated plunger, a pair of dependent arms carried by the handle and abutting the upper end of said plungers, a circuitous passageway connecting one cylinder above its valve with the other cylinder below its valve, a passageway between the last-mentioned cylinder and the tank connection, a pump chamber in the body connected with the pump connection, a cylinder chamber in the body connected with the container connection, a passageway interconnecting the pump chamber and the lower end of the first-mentioned cylinder, a passageway interconnecting the chambers, a ball in the pump chamber, a ball valve seated at the inner end of the cylinder chamber, a metering rod interconnecting the valve in the cylinder chamber and the ball in the pump chamber through the passageway interconnecting said chambers, a reduced portion of said rod in the last-mentioned passageway, a spring in the cylinder chamber for urging the ball valve in said chamber to seated position, a spring in the pump chamber for urging the ball in the direction of the rod and a passageway interconnecting the circuitous passageway and the passageway connecting the chambers.

4. A device of the character described comprising a body having valved passages therein and having a pump connection, a container connection and a tank connection, a head for said body, a pair of shafts vertically reciprocable in said head, a handle at the upper end of each shaft and means operable by the selective movement of said handles to selectively cause a flow of fluid from the pump to the container, from the pump to the tank and from the container to the tank, said means including a pair of cylinders vertically disposed in said body, a ball valve seated in the lower end of each cylinder, a plunger affixed to the lower end of each shaft and slidably mounted in the upper end of each cylinder, a spring interposed between each of the valves and its associated plunger, a circuitous passageway connecting one cylinder above its valve with the other cylinder below its valve, a passageway between the last-mentioned cylinder and the tank connection, a pump chamber in the body connected with the pump connection, a cylinder chamber in the body connected with the container connection, a passageway interconnecting the pump chamber and the lower end of the first-mentioned cylinder, a passageway interconnecting the chambers, a ball in the pump chamber, a ball valve seated at the inner end of the cylinder chamber, a metering rod interconnecting the valve in the cylinder chamber and the ball in the pump chamber through the passageway interconnecting said chambers, a reduced portion of said rod in the last-mentioned passageway, a spring in the cylinder chamber for urging the ball valve in said chamber to seated position, a spring in the pump chamber for urging the ball in the direction of the rod and a passageway interconnecting the circuitous passageway and the passageway connecting the chambers.

NORMAN R. ASHBAUGH.

REFERENCES CITED

The following references are of record in the file of this patent:

UNITED STATES PATENTS

| Number | Name | Date |
| --- | --- | --- |
| 1,956,775 | Ross | May 1, 1934 |
| 2,240,193 | Pick | Apr. 29, 1941 |
| 2,324,690 | Gardiner | July 20, 1943 |
| 2,393,805 | Parker | Jan. 29, 1946 |